United States Patent
Dean-Bhïyan et al.

(10) Patent No.: US 11,140,551 B2
(45) Date of Patent: Oct. 5, 2021

(54) AIRCRAFT SMART CABIN HEADSET AND METHOD FOR ESTABLISHING SECURE WIRELESS COMMUNICATION WITH AIRCRAFT CABIN AUDIO SYSTEM

(71) Applicant: MITSUBISHI HEAVY INDUSTRIES, LTD., Tokyo (JP)

(72) Inventors: Sasha Dean-Bhïyan, Aichi (JP); Renato Seiji Morita, Aichi (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 335 days.

(21) Appl. No.: 16/503,007

(22) Filed: Jul. 3, 2019

(65) Prior Publication Data
US 2020/0314646 A1    Oct. 1, 2020

Related U.S. Application Data

(60) Provisional application No. 62/826,229, filed on Mar. 29, 2019.

(51) Int. Cl.
| | | |
|---|---|---|
| *H04W 12/06* | (2021.01) | |
| *H04W 76/10* | (2018.01) | |
| *H04R 1/10* | (2006.01) | |

(52) U.S. Cl.
CPC .......... *H04W 12/06* (2013.01); *H04R 1/1041* (2013.01); *H04W 76/10* (2018.02); *H04R 2420/07* (2013.01)

(58) Field of Classification Search
CPC ....... H04W 12/06; H04W 76/10; H04W 4/42; H04R 1/1041; H04R 2420/07; H04R 1/1025; H04R 2201/107; H04L 63/0861
See application file for complete search history.

(56) References Cited

U.S. PATENT DOCUMENTS

| | | | | |
|---|---|---|---|---|
| 2009/0108649 A1* | 4/2009 | Kneller | ................. | B64D 11/00 297/217.6 |
| 2010/0224727 A1* | 9/2010 | Bauer | ............. | B64D 11/00151 244/118.5 |
| 2018/0309808 A1* | 10/2018 | Andon | .................. | H04L 65/403 |
| 2019/0196475 A1* | 6/2019 | Vandewall | ............. | B64D 11/00 |
| 2020/0028687 A1* | 1/2020 | Castet | .................. | H04L 9/3231 |

* cited by examiner

*Primary Examiner* — Eugene Yun
(74) *Attorney, Agent, or Firm* — Osha Bergman Watanabe & Burton LLP

(57) ABSTRACT

An aircraft cabin audio communication system includes: a plurality of aircraft smart cabin headsets, each including a microphone and an earpiece. The earpiece includes a speaker; a first biometric sensor disposed on a first button; a second biometric sensor disposed on a second button; a third biometric sensor disposed on a third button; a wireless transceiver; a power button; and a processor that: performs device authentication of the aircraft smart cabin headset based on a device identifier of the aircraft smart cabin headset; performs first authentication based on first biometric data obtained from the first biometric sensor; establishes user connection with cabin speakers; performs second authentication based on second biometric data obtained from the second biometric sensor; and transmits information that comprises a connection request to a cockpit terminal of the aircraft through the wireless transceiver.

7 Claims, 15 Drawing Sheets

FIG. 5

| Functions | | Cockpit | Passenger Cabin | | | |
|---|---|---|---|---|---|---|
| Type of Call | Call Status | Aural and Visual Indications | Attendant Handsets Display | Cabin Speakers | Headset | Mobile Device |
| Cockpit-to-Attendant Call (Normal) | Call Start | As per cockpit design | Incoming call indication (Normal) | Normal call aural | Incoming call aural (Normal) | Incoming call indication (Normal) and vibration |
| | Call in Progress | | Call in progress indication (Normal) | - | Voice communication | Call in progress indication (Normal) |
| | Call End | | Indication off | - | - | Indication off |
| Cockpit-to-Attendant Call (Emergency) | Call Start | | Incoming call indication (Emergency) | Emergency call aural | Incoming call aural (Emergency) | Incoming call indication (Emergency) and vibration |
| | Call in Progress | | Call in progress indication (Emergency) | - | Voice communication | Call in progress indication (Emergency) |
| | Call End | | Indication off | - | - | Indication off |
| Attendant-to-Cockpit Call (Normal) | Call Start | | Outgoing call indication (Normal) | - | Ringing tone | Outgoing call indication (Normal) |
| | Call in Progress | | Call in progress indication (Normal) | - | Voice communication | Call in progress indication (Normal) |
| | Call End | | Indication off | - | - | Indication off |
| Attendant-to-Cockpit Call (Emergency) | Call Start | | Outgoing call indication (Emergency) | - | Ringing tone | Outgoing call indication (Emergency) |
| | Call in Progress | | Call in progress indication (Emergency) | - | Voice communication | Call in progress indication (Emergency) |
| | Call End | | Indication off | - | - | Indication off |
| Attendant-to-Attendant Call | Call Start | | Cabin-to-cabin call indication | - | Ringing tone | Incoming/Outgoing call indication |
| | Call in Progress | | Cabin-to-cabin call in progress indication | - | Voice communication | Call in progress indication |
| | Call End | | Indication off | - | - | Indication off |
| Passenger Call | Call Start | | Passenger call indication | Passenger call aural | Passenger call aural | Passenger call indication and vibration |
| | Call Reset | | Indication off | - | - | Indication off |
| Lavatory Call | Call Start | | Lavatory call indication | Lavatory call aural | Lavatory call aural | Lavatory call indication and vibration |
| | Call Reset | | Indication off | - | - | Indication off |

FIG. 6

| Type of Call | End Point Status | | Call Status |
| --- | --- | --- | --- |
| | Cockpit Call | Attendant Handset, Headset, and/or Mobile Device Call | |
| Cabin to Cockpit or Cockpit to Cabin | Call Active | At least 1 Call Active | Call Active |
| | Call Active | All Call Inactive | Call Inactive |
| | Call Inactive | Any combination | Call Inactive |
| Cabin to Cabin | N/A | At least 2 Call Active | Call Active |
| | N/A | Less than 2 Call Active | Call Inactive |

FIG. 15

| Function | Source | Priority | Remark |
|---|---|---|---|
| Passenger Address | Cockpit | 1 | Disables 2, 3 and 4 |
| Passenger Address | Attendant Handset, Headset, and/or Mobile Device | 2 | Disables 3 and 4 |
| Pre-Recorded Announcement | Cabin Audio/Video System | 3 | Disables 4 |
| Background Music and Video | Cabin Audio/Video System | 4 | |

AIRCRAFT SMART CABIN HEADSET AND METHOD FOR ESTABLISHING SECURE WIRELESS COMMUNICATION WITH AIRCRAFT CABIN AUDIO SYSTEM

BACKGROUND

Technical Field

The present invention generally relates to a headset, more specifically to an aircraft smart cabin headset, and a method for establishing secure wireless communication with an aircraft cabin audio system.

Description of Related Art

The primary role of cabin flight attendants is to ensure the safety and comfort of passengers. The number of attendants required on commercial flights is mandated by international operational regulations. During any given flight, an attendant is expected to perform a variety of tasks, including communicating with passengers, cockpit crew, and other flight attendants over the aircraft PA (Passenger Address) and intercom system. Such communication is conventionally limited to fixed handsets located at attendant stations in the cabin or through direct communication between individuals.

Although handsets are ubiquitous in commercial aircraft, they are typically hardwired to a wall or monument in the cabin, which requires the attendants to physically move to the limited locations of the handsets to use the handsets. Further, if the handset is picked up and held by hand, the attendant loses the use of that hand for performing other cabin duties. In an effort to free up both hands, attendants often attempt to hold the handset between the shoulder and neck, which is uncomfortable and further restricts the full range of head movement and peripheral vision necessary to perform safe cabin duties. Flight attendants can use consumer-grade wireless (i.e., Bluetooth) headsets for communication with one another in the cabin. However, such consumer-grade, off-the-shelf headsets are not permitted to interface with the aircraft audio system and are not qualified for aircraft use.

SUMMARY

One or more embodiments of this disclosure provide an aircraft smart cabin headset, a method for establishing a wireless audio connection, and an aircraft cabin audio communication system.

According to one or more embodiments, an aircraft cabin audio communication system comprises: a plurality of aircraft smart cabin headsets, each comprising a microphone and an earpiece. The earpiece comprises a speaker; a first button, a second button, and a third button; a first biometric sensor disposed on the first button; a second biometric sensor disposed on the second button; a third biometric sensor disposed on the third button; a wireless transceiver; a power button that switches between a supply of electric power and a stoppage of the supply from a battery to internal devices of the aircraft smart cabin headset; and a processor that: performs, when the wireless transceiver connects to an aircraft network, device authentication of the aircraft smart cabin headset based on a device identifier of the aircraft smart cabin headset, performs, upon detecting that the first button is depressed, first authentication based on first biometric data obtained from the first biometric sensor, establishes, upon determining that the first authentication is successful, user connection with the cabin speakers via the aircraft network, performs, upon detecting that the second button is depressed, second authentication based on second biometric data obtained from the second biometric sensor, transmits, upon determining that the second authentication is successful, information that comprises a connection request to a cockpit terminal of the aircraft through the wireless transceiver, performs, upon detecting that the third button is depressed, a third authentication of based on third biometric data obtained from the third biometric sensor, and transmits, upon determining that the third authentication is successful, information that comprises a connection request to another aircraft smart cabin headset through the wireless transceiver. According to one or more embodiments, the aircraft cabin audio communication system further comprises: a first server that stores biometric authentication data; and a second server that controls user connection among the plurality of aircraft smart cabin headsets, a cockpit terminal, and the cabin speakers, wherein the aircraft network connects the plurality of aircraft smart cabin headsets, the cockpit terminal, the cabin speakers, the first server, and the second server.

BRIEF DESCRIPTION OF DRAWINGS

FIG. 5 shows a table of aural and/or visual indications given by devices of the aircraft cabin audio communication system when the various calls are made as shown in FIG. 4.

FIG. 6 shows a table indicating call statuses according to one or more embodiments.

FIG. 15 shows a table indicating priorities of various calls in one or more embodiments.

DETAILED DESCRIPTION

Figure 1:
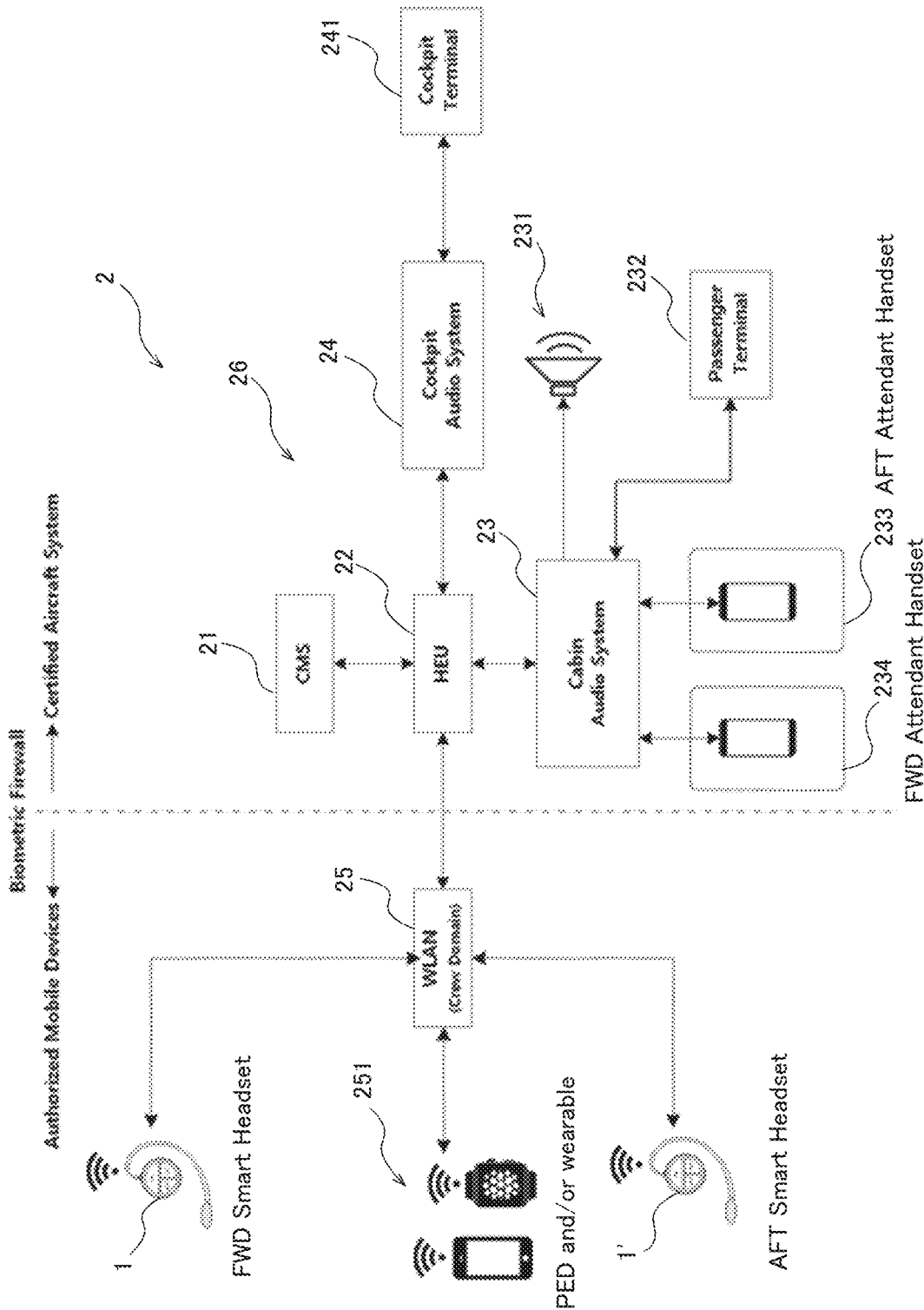
FIG. 1 shows a schematic view of an aircraft cabin audio communication system according to one or more embodiments.

Embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

An aircraft cabin audio communication system according to one or more embodiments uses one or more aircraft "smart" cabin headsets that allow authorized aircraft personnel to communicate instantaneously and share real-time information from anywhere in the aircraft cabin, thereby improving cabin communication and operations. The aircraft smart cabin headsets of one or more embodiments may work in conjunction with preexisting aircraft audio systems and other certified aircraft systems by using the Wireless Local Area Network (WLAN) system. The aircraft smart cabin headsets may also work in conjunction with other smart devices (smartphones, smart watches, etc.) that are authorized for use by the certified aircraft systems.

FIG. 1 shows a schematic view of the aircraft cabin audio communication system 2 located in an aircraft according to one or more embodiments. The aircraft cabin audio communication system 2 includes a cabin management system (CMS, first server) 21, a head-end unit (HEU, second server) 22, a cabin audio system 23, a cockpit audio system 24, a wireless network (shown as "WLAN" in FIG. 1) 25, and an aircraft network 26 that connects and enables communication among the CMS 21, the HEU 22, the cabin audio system 23, the cockpit audio system 24, and the wireless network 25.

The HEU 22 is a server that administrates the user connection of the aircraft cabin audio communication system 2 in one or more embodiments. The CMS 21 is a server that provides an interface for setting and diagnosing the electric and electronic systems in the cabin, e.g., audio, lighting, interphone, Passenger Address (PA) system, etc. In one or more embodiments, the CMS 21 may also store biometric data for biometric authentication (to be described later). To utilize the functions provided by the CMS 21 (e.g., user authentication or device authentication), a CMS terminal (not shown) may be used as an interface device to access the CMS 21. In one or more embodiments, the HEU 22 and the CMS 21 may be implemented by the same server.

The cabin audio system 23 may be a computer that connects to: the HEU 22; cabin speakers 231 for public address; passenger terminals 232 disposed for each passenger position in the cabin or lavatories; attendant handsets 233 and 234 mounted at predetermined places in the cabin. The passenger terminals 232 installed in the passenger cabin or in the lavatories, include, among other functions, an attendant call switch. The cabin audio system 23 can be defined as an integration between the HEU 22 and one or more of the cabin speakers 231, the passenger terminals 232, and the handsets 233 and 234.

The cockpit audio system 24 may be a computer that connects to the HEU 22 and a cockpit terminal 241 that is used by a cockpit crew. The cockpit audio system 24 relays sound signals between the HEU 22 and the cockpit terminal 241. The cockpit terminal 241 may include, for example, a hand microphone, headset, cockpit speakers, and oxygen mask microphones. The wireless network 25 has a wired connection with the HEU 22 and wireless connection with aircraft smart cabin headsets 1 and 1' wearable by flight attendants and mobile devices 251 such as a smartphone or smartwatch.

In one or more embodiments, the HEU 22, the cockpit audio system 24, and the cabin audio system 23 are connected by wire to establish a certified aircraft network. On the other hand, wireless devices such as the aircraft smart cabin headsets 1 and 1' and the mobile devices 251 are authorized by the HEU 22 when they log on to the aircraft network 26, e.g., by using a device identifier (ID) and/or biometric data of the user may be employed.

Figure 2:
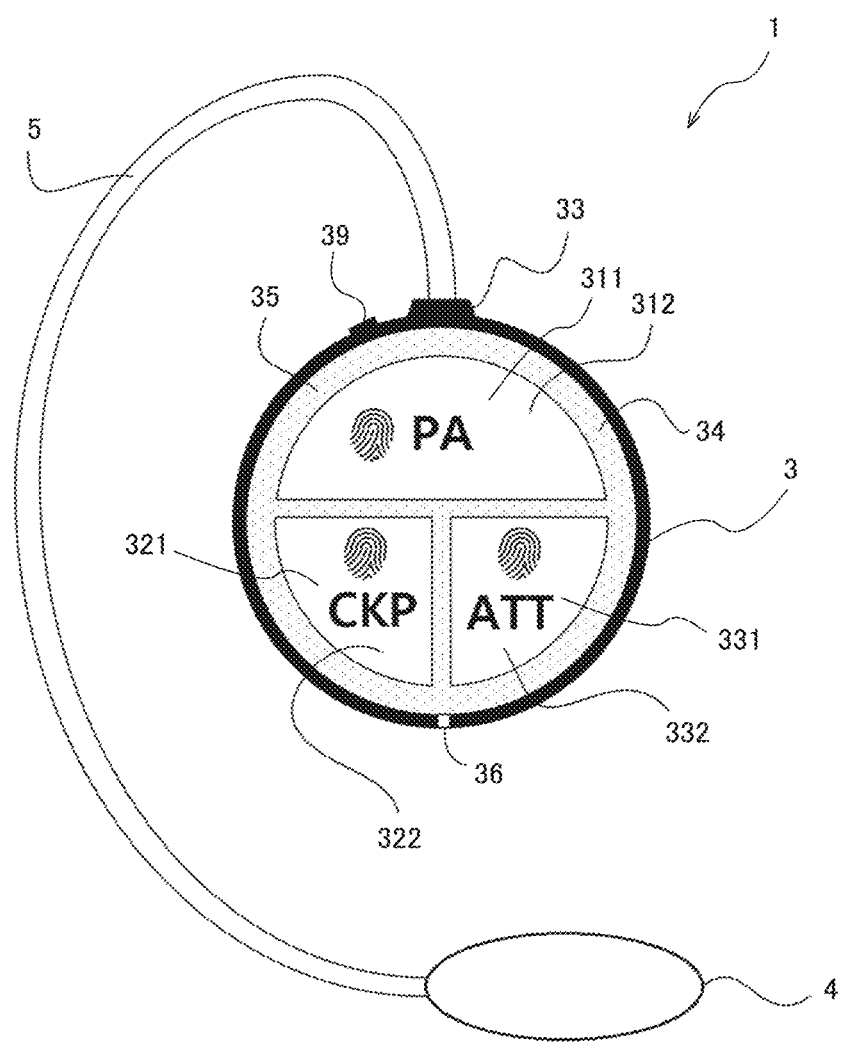
FIG. 2 shows a schematic view of an aircraft smart cabin headset according to one or more embodiments.
Figure 3:
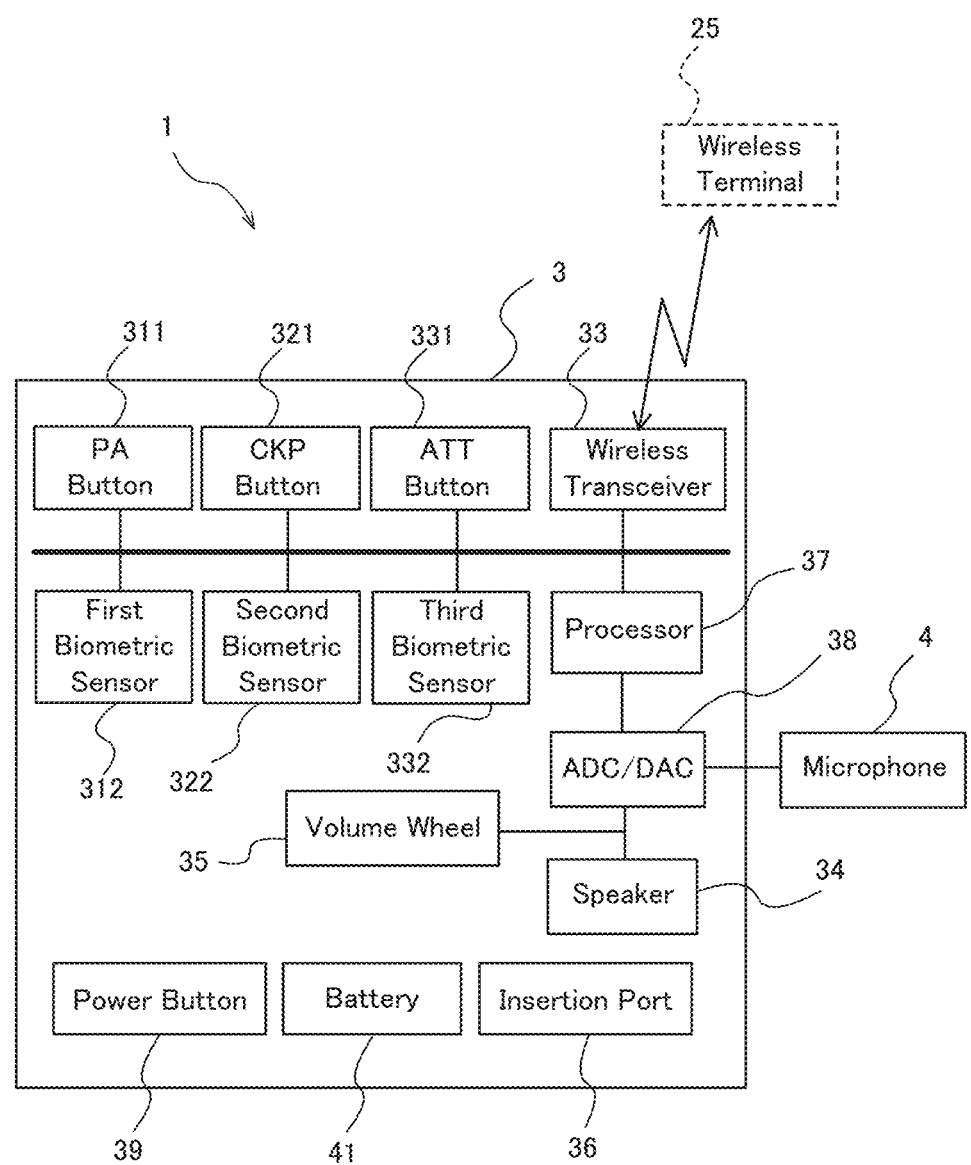
FIG. 3 shows a hardware diagram of the aircraft smart cabin headset according to one or more embodiments.

FIG. 2 shows a schematic view of the aircraft smart cabin headsets 1 and 1' according to one or more embodiments. FIG. 3 shows a hardware diagram of the aircraft smart cabin headsets 1 and 1' according to one or more embodiments. As shown in FIGS. 2 and 3, the aircraft smart cabin headsets 1 and 1' includes an earpiece 3, a microphone 4, and an ear mount 5. The earpiece 3 includes a PA button (first button or switch) 311, a CKP (Cockpit) button (second button or switch) 321, an ATT (Attendant) button (third button or switch) 331, a wireless transceiver 33, a processor 37, ADC/DAC (Analogue to Digital Converter/Digital to Analogue Converter) 38, a speaker 34, a volume wheel 35, and a power button 39. Although the figures show the aircraft smart cabin headset 1 having three buttons, the present invention is not limited by the number, placement, shape, etc. of the buttons.

The ear mount 5 physically connects the earpiece 3 and the microphone 4, and electrically connects the processor 37 and the microphone 4. As shown in FIGS. 1 and 2, one end of the ear mount 5 is hung from an ear of the user so as to position the speaker 34 of the earpiece 3 near the ear of the user. The other end of the ear mount 5 is connected to the microphone 4. The ear mount 5 may be made of plastic or metal and be flexible/deformable to allow the microphone 4 to be positioned near the mouth of the user.

Further, as shown in FIG. 2, the PA button 311, the CKP button 321, and the ATT button 331 are on the earpiece 3. These buttons can be mechanically pressed down, and, when pressed and released, cause the processor 37 to detect a change in button status. As shown in the example of FIG. 2, the PA button 311 may be larger than both the CKP button 321 and the ATT button 331, while the CKP button 321 and the ATT button 331 may be approximately the same size. As described later, in one or more embodiments, the PA button 311 is configured to be depressed for a longer time period than the CKP button 321 and the ATT button 331. Thus, as shown in the example of FIG. 2, the PA button 311 is made larger than the other buttons to enable the longer depression easier for the users. In one or more embodiments, a second type of activation may also be used. For example, the biometric validation may activate the PA (or user connection with the aircraft network 26) with an audible confirmation (e.g., tone). As another example, a timer may be implemented to the aircraft smart cabin headset 1, and when no voice input is detected through the microphone 4 after a short, predetermined time period (e.g., five seconds), the user connection with the aircraft network 26 is deactivated. The PA would stay active until the PA button 311 is pressed again. This example may offer more comfort to flight attendants during the announcement.

In one or more embodiments, the aircraft smart cabin headsets are intended to supplement a certified aircraft system and are intended only for authorized aircraft personnel. Thus, security is ensured in some embodiments by requiring an authentication process for each user and/or headset. For example, as shown in FIGS. 2 and 3, a first biometric sensor 312, a second biometric sensor 322, and a third biometric sensor 332 may be disposed on the PA button 311, the CKP button 321, and the ATT button 331, respectively, for biometric user authentication. Each of the biometric sensors 312, 322, and 332 may be a fingerprint scanner that scans a fingerprint of the user. This may be, for example an optical scanner, capacitive scanner, or ultrasonic scanner. Other types of biometric sensors (e.g., facial recognition, iris recognition, vein recognition, etc.) may also be used without deviating from the scope of the present invention. For added security, one or more embodiments of the invention may also require that each of the headsets be authenticated for use within the aircraft cabin (to be described below with reference to FIG. 8).

As shown in FIGS. 2 and 3, the wireless transceiver 33 transmits radio signals to and receives radio signals from the wireless network 25 to establish wireless communication with the aircraft network 26. The speaker 34 emits sound based on the signals from the ADC/DAC 38. The microphone 4 senses sounds and transmits the signal to the ADC/DAC 38 and then to the processor 37.

The volume wheel 35 is disposed around the PA button 311, the CKP button 321, and ATT button 331, and is rotated by a user to change the audio volume of the speaker 34. Further, the earpiece 3 can include a battery 41 as a power supply and an insertion port 36 to charge the battery 41 and/or to send and receive the data such as the software executed by the processor 37. The power button 39 that switches between a supply of electric power and a stoppage of the supply from the battery 41 to internal devices of the aircraft smart cabin headset 1.

Figure 4:
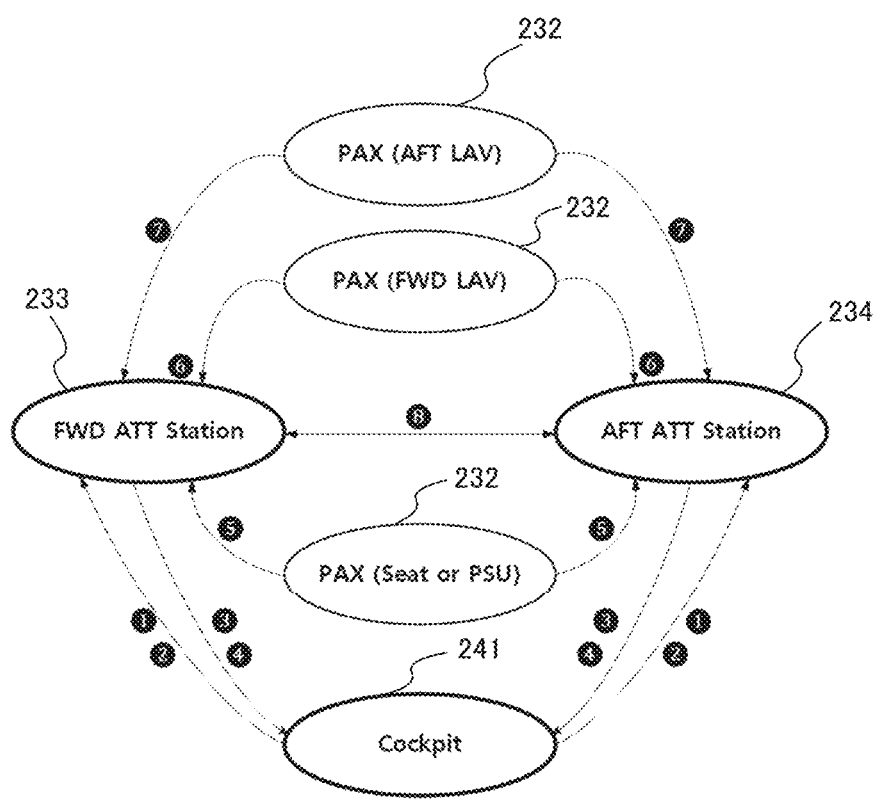
FIG. 4 shows a schematic diagram of calls made among pilots (or cockpit crew), flight attendants, and passengers according to one or more embodiments.

FIG. 4 shows a schematic diagram of calls made among cockpit crew, flight attendants, and passengers according to one or more embodiments. The cockpit crew uses the cockpit terminal 241 in the cockpit. The passenger (PAX) uses the passenger terminals 232 at the seat and in the fore lavatory (FWD LAV) located at the front side of the cabin and the aft lavatory (AFT LAV) located at the rear side of the cabin. Finally, the attendants use the attendant handset 233 at the fore attendant station (FWD ATT Station) located at the front side of the cabin and attendant handset 234 at the aft attendant station (AFT ATT Station) located at the rear side of the cabin, and the aircraft smart cabin headsets 1 and 1'. The number of passenger terminals, attendant stations, handsets, and headsets is not limited to this example.

Each of the aircraft smart cabin headsets 1 in the cabin can have a similar function as the handsets 233 at the FWD ATT Station and the handsets 234 at the AFT ATT Station shown in FIG. 4. Thus, in addition to the attendant handsets 233 and 234, the aircraft smart cabin headsets 1 and 1' can make calls and receive calls. In one or more embodiments of the aircraft cabin audio communication system 2, calls can be made from the FWD/AFT ATT Station, the PAX at seat, at the FWD/AFT LAV, and the cockpit. All of the calls can be received at the FWD/AFT ATT Station. A call from the FWD/AFT ATT Station to the cockpit can also be performed. Emergency calls can also be made between the cockpit and the FWD/AFT ATT Station.

FIG. 5 shows a table of aural and/or visual indications given by the devices of the aircraft cabin audio communication system 2 when the various calls are made as shown in FIG. 4. As shown in FIG. 5, each of the terminals that configures the aircraft cabin audio communication system 2, except for terminals for passengers, shows aural and/or visual indications when the call is incoming and during the call in progress. The attendant handsets 233 and 234, the cockpit terminal 241, and the aircraft smart cabin headsets 1 and 1' may join the call in progress. In some embodiments, the aircraft cabin audio communication system 2 may accept a plurality of calls simultaneously. In other embodiments, speakers installed in the terminals above or at the passenger seats may be configured to sound call aurals. Alternatively, when all flight attendants are wearing the smart headsets, the aircraft cabin audio communication system 2 may be configured such that no chime sound is generated in the cabin, which improves passenger comfort.

FIG. 6 shows a table indicating, by way of example, call statuses of the calls among the cockpit terminals and the cabin according to one or more embodiments. As shown, when at least two terminals among the cockpit terminal 241, the attendant handsets 233 and 234, the mobile devices 251, and the aircraft smart cabin headsets 1 and 1' are active, the call status becomes active.

Figure 7:
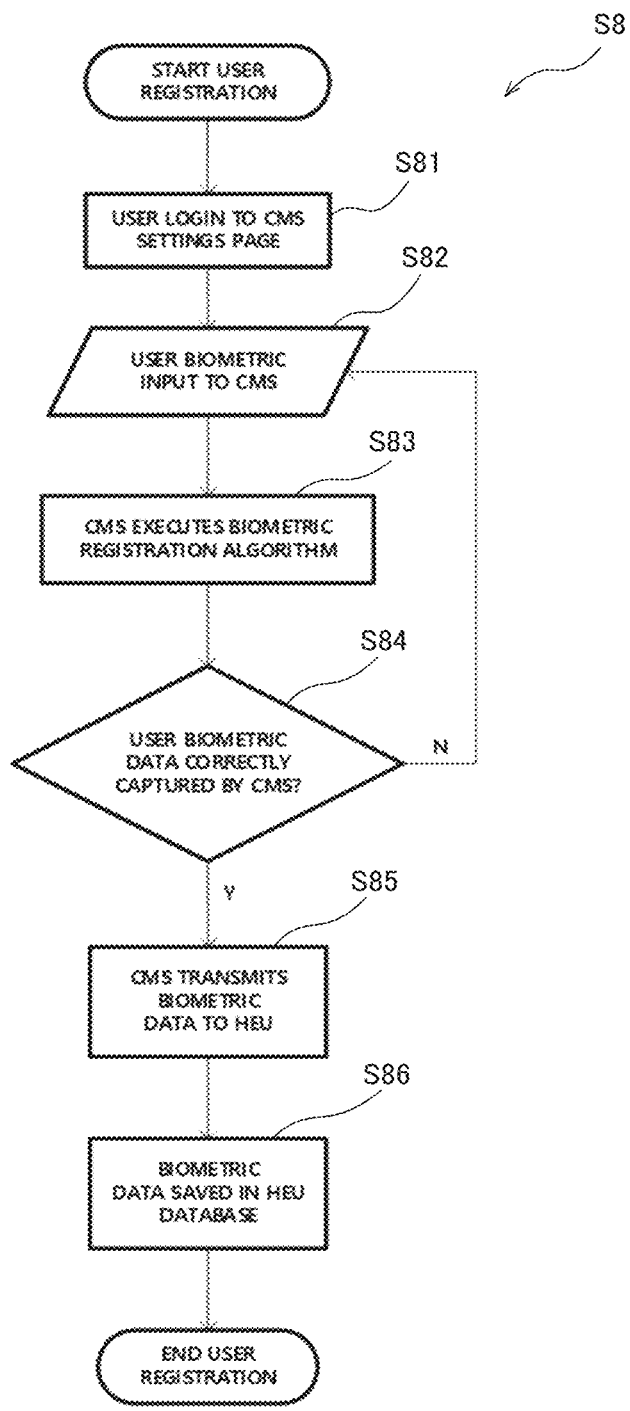
FIG. 7 shows a flowchart of a user registration process according to one or more embodiments.

FIG. 7 shows a flowchart of the user registration process S8 executed by the CMS 21 and the HEU 22 according to one or more embodiments. Such a process is implemented in one or more embodiments to register the biometric data of authorized users of the aircraft smart cabin headsets. The registered biometric data is then used to perform user authentication (to be described later).

As shown in FIG. 7, in the user registration process S8, firstly the user logs on to a CMS setting page (Step S81). Then, the user inputs the biometric data to the CMS 21 through a biometric sensor (Step S82) and the CMS 21 executes a registration algorithm to register the biometric data for future user authentication (Step S83). The CMS 21 confirms whether the user biometric data is acceptable for authentication (Step S84). When the user biometric data is not read properly or is otherwise unacceptable for authentication (Step S84: No), the user repeats Step S82 to S84. When the user biometric data is acceptable for authentication (Step S84: Yes), the CMS 21 transmits the user biometric data to the HEU 22 (Step S85). Upon receiving the user biometric data, the HEU 22 stores the user biometric data as biometric authentication data (Step S86). Once the user biometric data is registered as described above, user authentication can be performed by using the biometric authentication data stored in the HEU 22.

Figure 8:
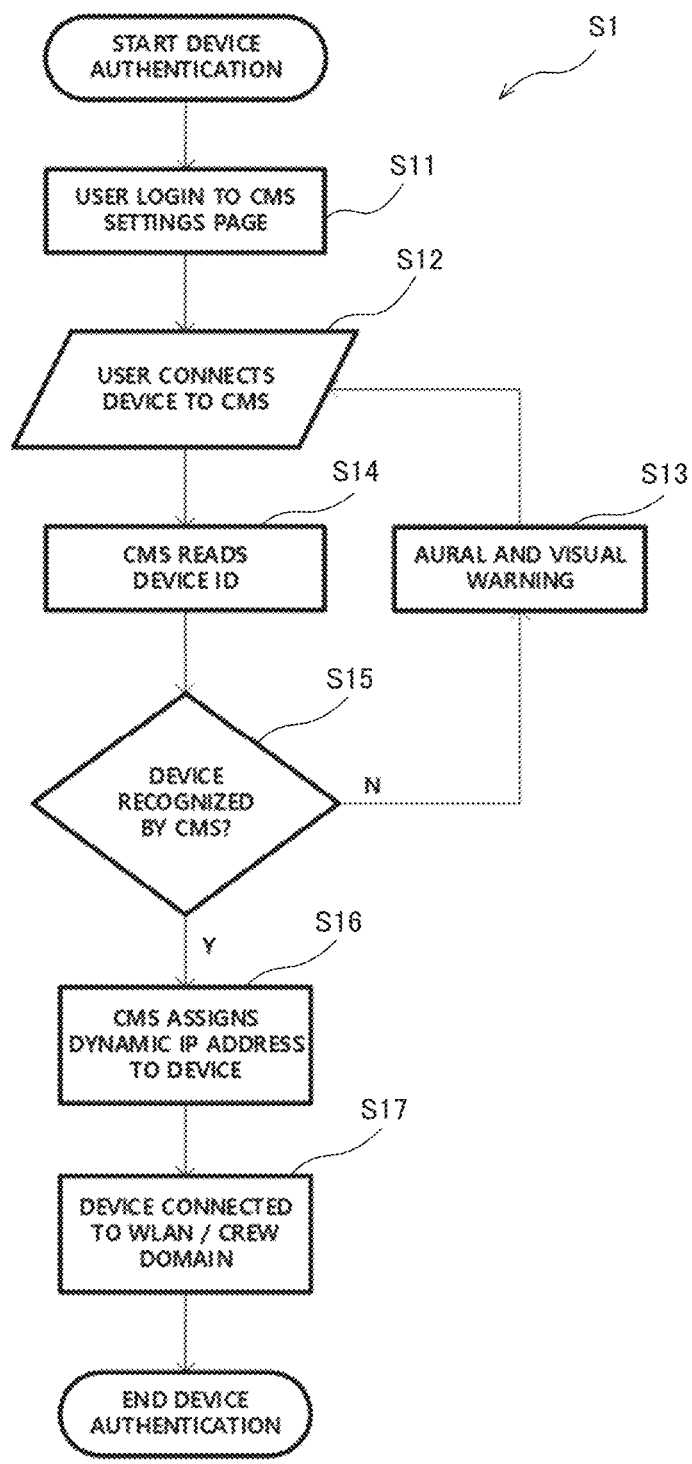
FIG. 8 shows a flowchart of a device authentication process according to one or more embodiments.

FIG. 8 shows a flowchart of a device registration process 51 according to one or more embodiments. In one or more embodiments, such a device registration process may be required for each aircraft smart cabin headset 1 in addition to the user registration discussed above (i.e., a two-step registration process for both the user and the device). In such embodiments, before the aircraft smart cabin headset 1 can be used in the aircraft cabin, it must be registered on the aircraft network 26. The device registration process 51 may be required once per device per flight, and is initiated at the CMS 21. The aircraft smart cabin headset 1 must first be connected to the CMS 21 via a wired or wireless connection. If the CMS 21 recognizes the aircraft smart cabin headset 1's device identifier, then a handshake occurs between the CMS 21 and the aircraft smart cabin headset 1, and the aircraft smart cabin headset 1 is registered as a valid device on to the aircraft network 26. In one or more embodiments, such a two-step device registration and user registration process is needed only once at the beginning of each flight. Once the aircraft smart cabin headset 1 and the user biometric data have been registered, the authorized user may activate the functions of the registered aircraft smart cabin headset 1 as long as their biometric data matches the stored biometric data in the HEU 22. For example, to initiate a PA function, the user presses the PA button and his/her biometric data is sent to the HEU 22 to determine a match. If a match is found, the PA announcement may go through and be announced on the cabin speakers (discussed in more detail below with reference to FIG. 12).

Returning to FIG. 8, in the device authentication process S1, the user logs on to a CMS settings page (Step S11) and connects the aircraft smart cabin headset 1 to the CMS 21 (Step S12) via a wired or wireless connection. Here, the CMS settings page may provide an interface for registering the aircraft smart cabin headset 1 as well as other electric and electronic systems in the cabin. Then, the CMS 21 reads the aircraft smart cabin headset 1's device identifier and compares it with the device identifiers pre-stored on the CMS 21 (Step S15). When no match is found, the aircraft smart cabin headset 1 is not recognized by the CMS 21 (Step S15: No). In this case, the aircraft smart cabin headset 1 may emit aural and/or visual warning (Step S13) and the device registration process Si returns to Step S12. On the other hand, when a matching device identifier is found on the CMS 21, the aircraft smart cabin headset 1 is recognized by the CMS 21 (Step S15: Yes) and receives an IP address (Step S16) from the CMS 21 to connect to the aircraft network 26 (Step S17). The device registration process exemplified above improves the overall security of the aircraft cabin audio communication system 2 and can improve the security of the aircraft network 26.

In one or more embodiments, once the aircraft smart cabin headset 1 is successfully authenticated by the device authentication process S 1, the aircraft smart cabin headset 1 may transmit a connection request for the HEU 22 that controls a connection among the aircraft smart cabin headset 1, the cockpit terminal 241, and the cabin speakers 231.

Figure 9:
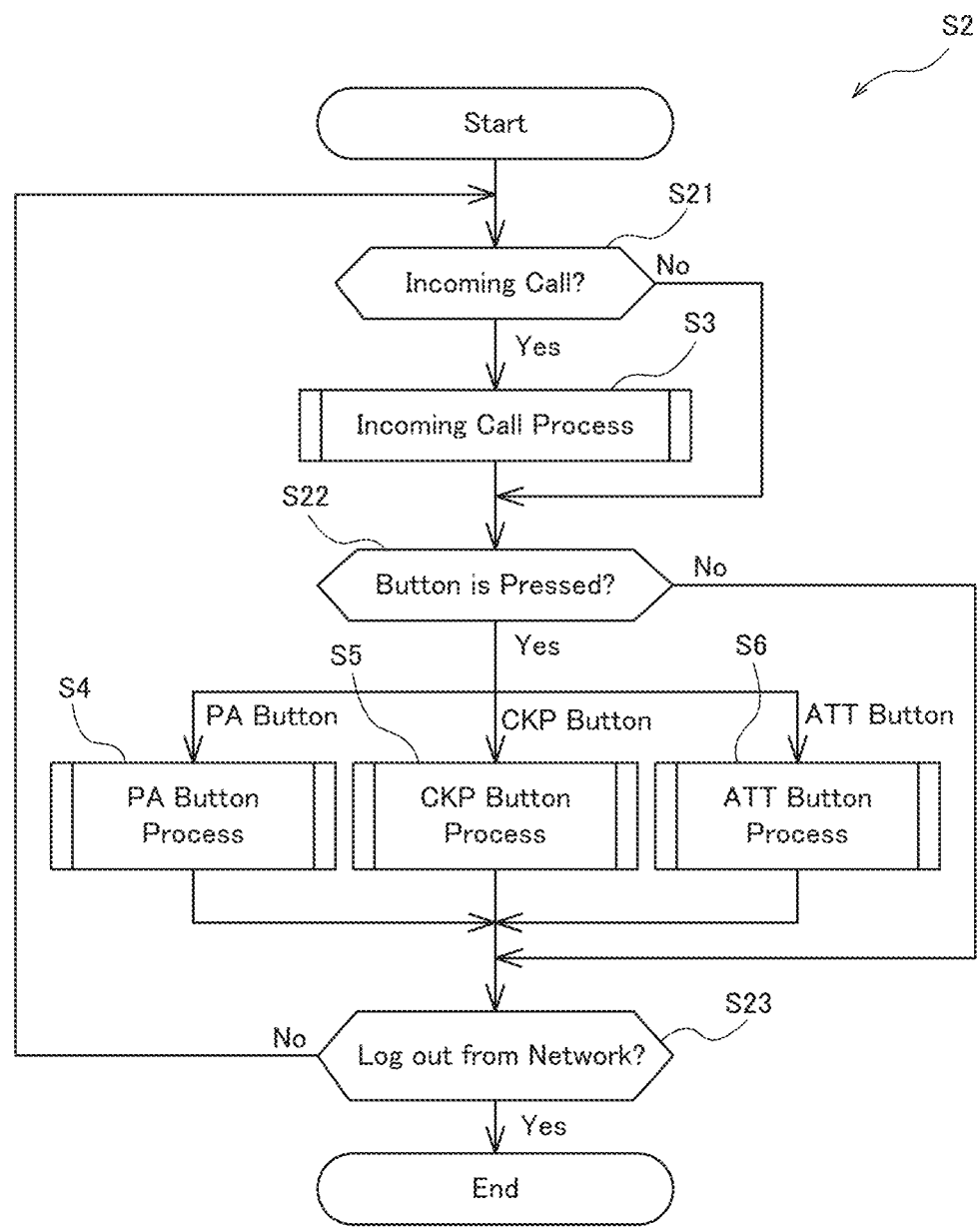
FIG. 9 shows a flowchart of a main audio communication process executed by the aircraft smart cabin headset according to one or more embodiments.

FIG. 9 shows a flowchart of the main audio communication process S2 executed by the processor 37 of the aircraft smart cabin headset 1 according to one or more embodiments. As shown, in the main audio communication process S2, the processor 37 confirms whether there is an incoming call to the aircraft smart cabin headset 1 (Step S21). When the processor 37 confirms there is an incoming call (Step S21: Yes), the processor 37 proceeds to the incoming call process S3 shown in FIG. 10.

When the processor 37 confirms there is no incoming call (Step S21: No) or once the incoming call process S3 is completed, the processor 37 confirms whether any one of the buttons 311, 321, or 331 are pressed (Step S22). When the processor 37 detects depression of the PA button 311 (Step S22: Yes, PA Button), the processor 37 proceeds to the PA button process S4 shown in FIG. 12. When the processor 37 detects the depression of the CKP button 321 (Step S22: Yes, CKP Button), the processor 37 proceeds to the CKP button process S5 shown in FIG. 13. When the processor 37 detects the depression of the ATT button 331 (Step S22: Yes, ATT Button), the processor 37 proceeds to the ATT button process S6 shown in FIG. 14.

When the processor 37 does not detect any depression of the buttons (Step S22: No), or once any one of the PA button process S4, the CKP button process S5, and the ATT button process S6 is completed, the processor 37 confirms whether a log-out instruction is received from the aircraft network 26 (Step: S23). When the processor 37 does not detect such a log-out instruction, the processor 37 returns the process to Step S21. When the processor 37 detects the log-out instruction, the processor 37 ends the main audio communication process S2.

Figure 10:
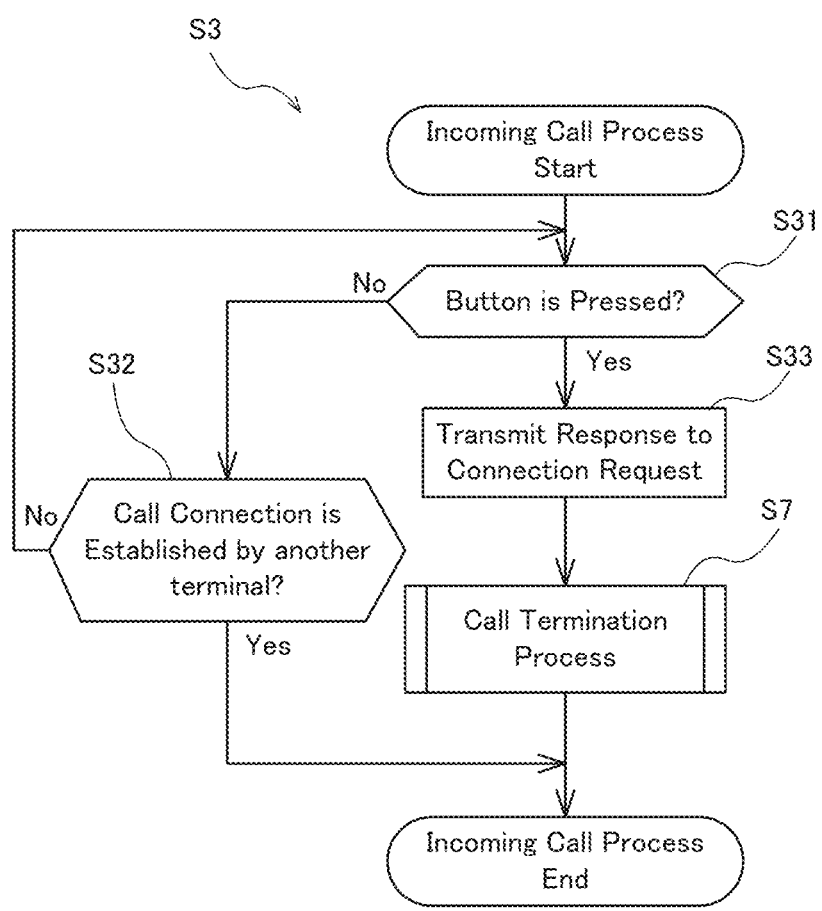
FIG. 10 shows a flowchart of an incoming call process executed by the aircraft smart cabin headset according to one or more embodiments.

FIG. 10 shows a flowchart of the incoming call process S3 executed by the processor 37 of the aircraft smart cabin headset 1 according to one or more embodiments. As shown, in the incoming call process S3, the processor 37 firstly confirms whether any one of the buttons 311, 321, or 331 is depressed during call reception (Step S31). When the processor 37 does not detect any depression of the buttons (Step S31: No), the processor 37 further confirms whether a user connection is established by another terminal (Step S32). When the user connection is established by another terminal (Step S32: Yes), the processor 37 ends the incoming call process S3. When the user connection is not established by another terminal (Step S32: No), the processor 37 returns the process to Step S31 and repeats Steps S31 and S32.

When the processor 37 detects a depression of one of the buttons (Step S31: Yes), the processor 37 transmits the response of the connection request to the HEU 22 through the wireless transceiver 33. When the HEU 22 receives the response of the connection request, the HEU 22 establishes the user connection between the aircraft smart cabin headset 1 and the terminal transmitting the connection request. After the user connection is established, the processor 37 proceeds to the call termination process S7 shown FIG. 11. Once the call termination process S7 is completed, the processor 37 ends the incoming call process S3.

Figure 11:
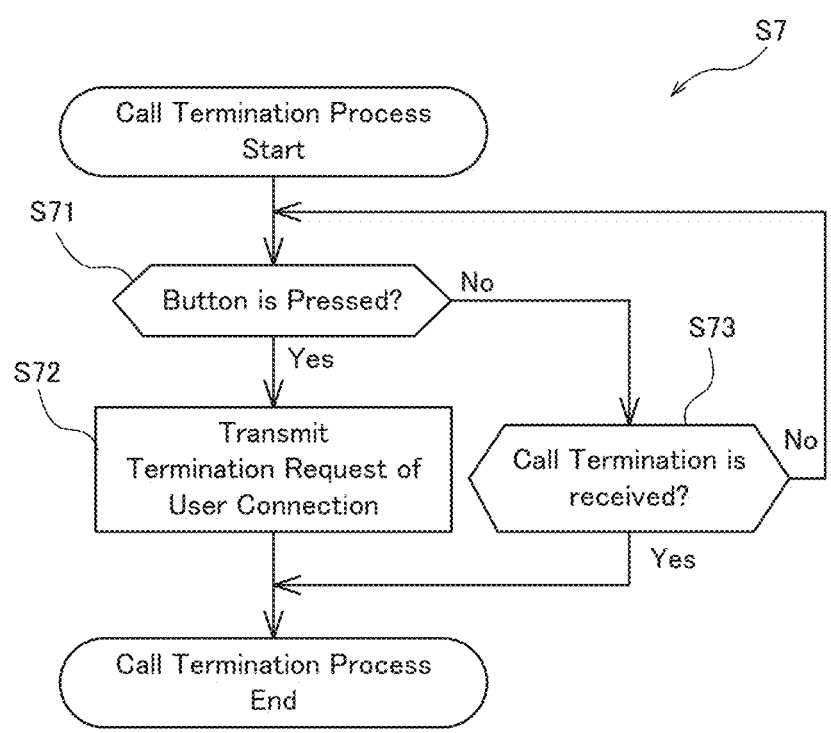
FIG. 11 shows a flowchart of a call termination process executed by the aircraft smart cabin headset according to one or more embodiments.

FIG. 11 shows a flowchart of the call termination process S7 executed by the processor 37 of the aircraft smart cabin headset 1 according to one or more embodiments. As shown, in the call termination process S7, the processor 37 confirms whether any one of the buttons 311, 321, or 331 is depressed during the user connection (Step S71). When the processor 37 does not detect any depression of the buttons (Step S71: No), the processor 37 further confirms whether the call termination from the HEU 22 is received (Step S73). When the call termination is received (Step S73: Yes), the processor 37 ends the call termination process S7. When the call termination is not received (Step S73: No), the processor 37 returns the process to Step S71 and repeats Steps S71 and S72. When the processor 37 detects depression of one of the buttons (Step S71: Yes), the processor 37 transmits the termination request of user connection to the HEU 22 (Step S72) and ends the call termination process S7.

Figure 12:
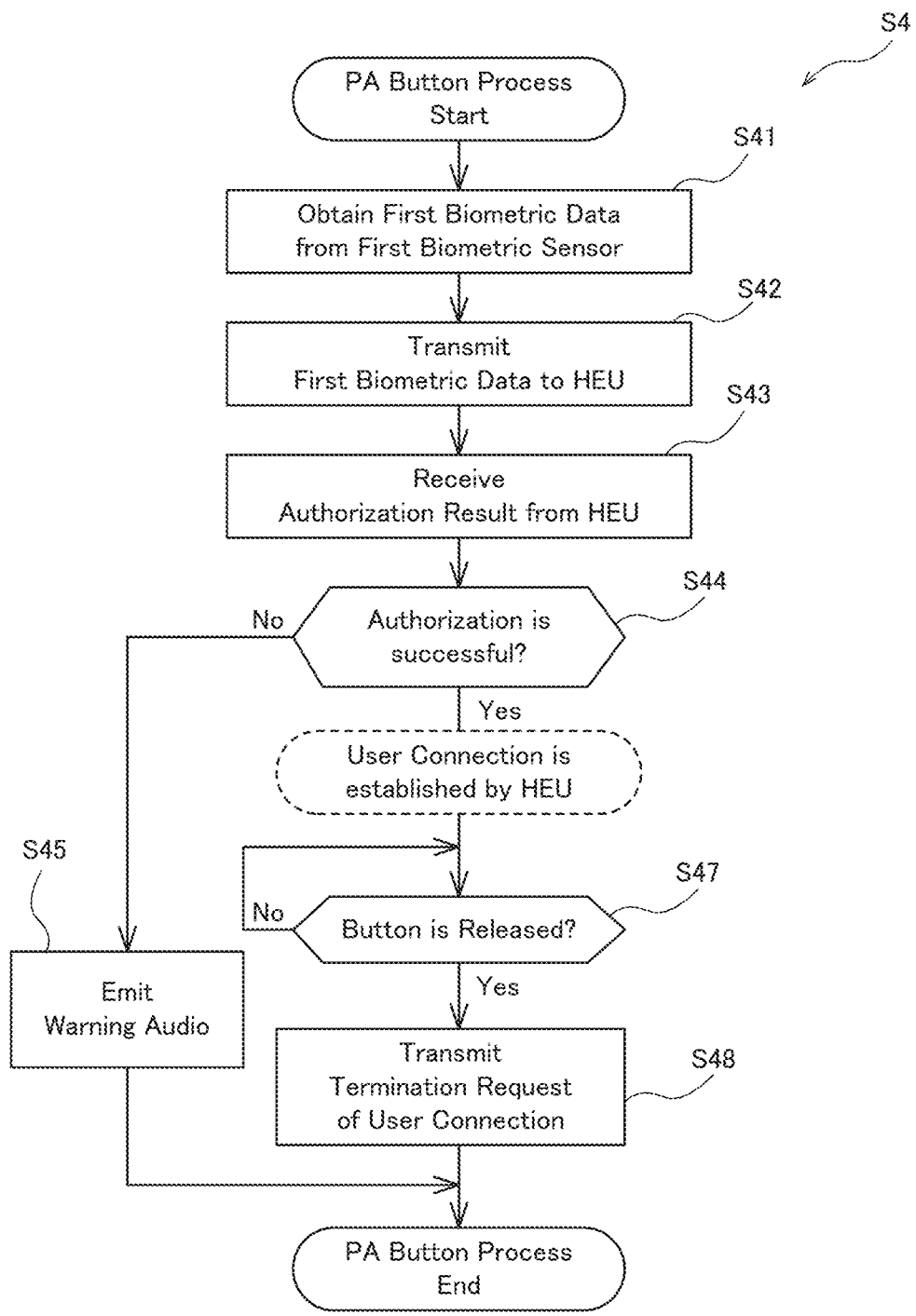
FIG. 12 shows a flowchart of a PA button process executed by the aircraft smart cabin headset according to one or more embodiments.

FIG. 12 shows a flowchart of the PA button process S4 executed by the processor 37 of the aircraft smart cabin headset 1 according to one or more embodiments. As shown, in the PA button process S4, the processor 37 obtains the first biometric data of the user from the first biometric sensor 312 (Step S41) and transmits the first biometric data to the HEU 22 through the wireless transceiver 33 (Step S42). The HEU 22 compares the first biometric data with biometric authentication data stored on the HEU 22 upon receiving the biometric data, and transmits the result of the comparison as a result of the first authentication to the aircraft smart cabin headset 1.

The processor 37 receives the result of the first authentication from the HEU 22 through the wireless transceiver 33 (Step S43) and confirms whether the first authentication is successful (Step S44). When the first authentication is unsuccessful (Step S44: No), the processor 37 causes the speaker 34 to emit a warning audio to inform the user of the failure of the authentication (Step S45) and ends the PA button process S4. When the first authentication is successful (Step S44: Yes), the user connection of the aircraft smart cabin headset 1 to the cabin speakers 231 is established by the HEU 22. The user connection is maintained as long as the PA button 311 is depressed. The HEU 22 may instruct the aircraft smart cabin headset 1 to emit a tone on speaker 34 to inform the user that the connection with the aircraft network 26 has been successfully established, thereby giving the user a cue to speak over the cabin speakers 231.

Then, the processor 37 confirms whether the PA button 311 is released throughout the duration of the user connection with the aircraft network 26 (Step S47). When the PA button 311 is not released (Step S47: No), the processor 37 returns the process to Step S47 and repeats Step S47. When the PA button 311 is released (Step S47: Yes), the processor 37 transmits a termination request of the voice connection (Step S48) to the HEU 22 to terminate the user connection with the aircraft network 26 and ends the PA button process S4.

Figure 13:
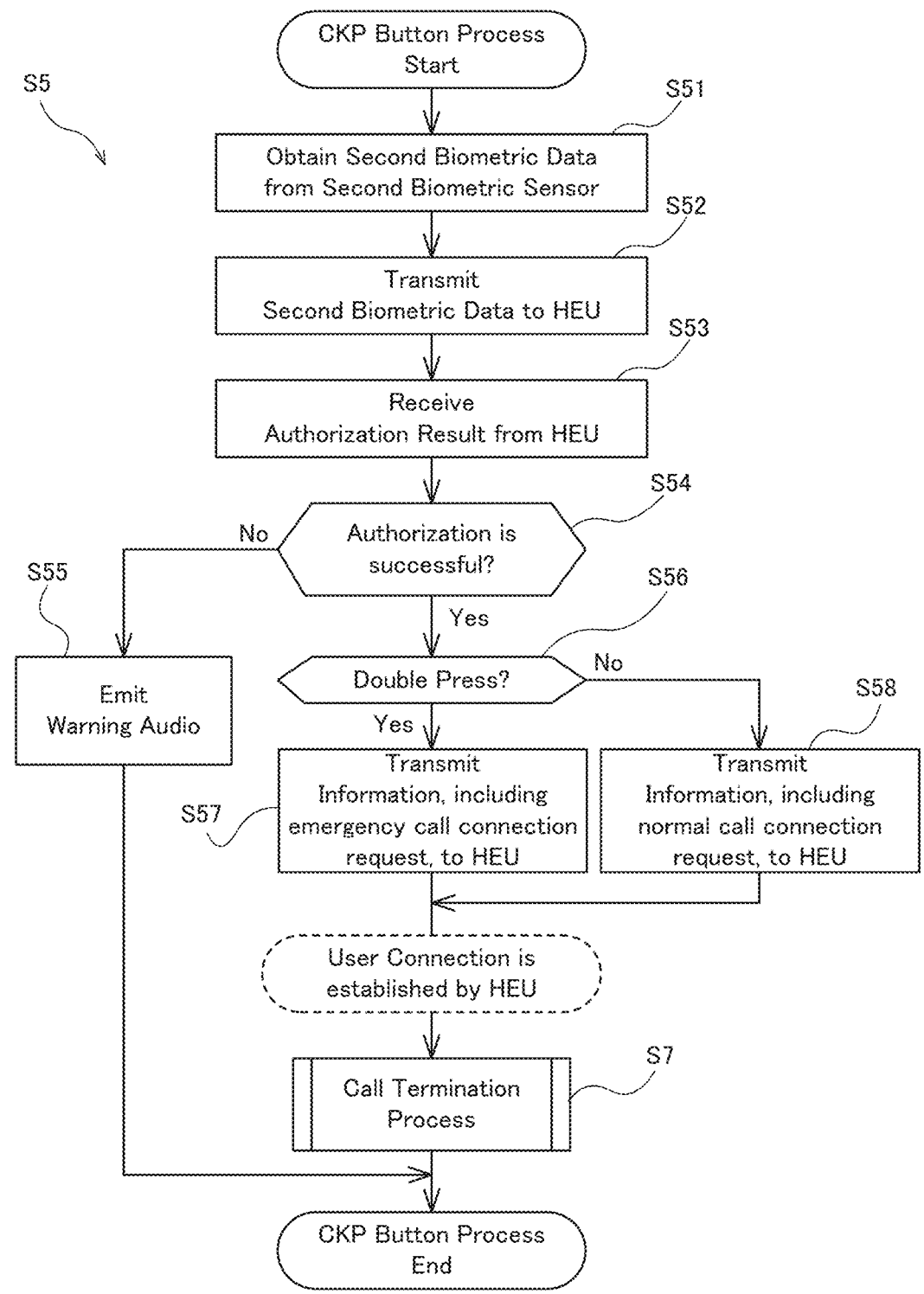
FIG. 13 shows a flowchart of a CKP button process executed by the aircraft smart cabin headset according to one or more embodiments.

FIG. 13 shows a flowchart of the CKP button process S5 executed by the processor 37 of the aircraft smart cabin headset 1 according to one or more embodiments. As shown, in the CKP button process S5, the processor 37 obtains second biometric data of the user from the second biometric sensor 322 (Step S51) and transmits the second biometric data to the HEU 22 (Step S52). The HEU 22 compares the second biometric data with biometric authentication data stored on the HEU 22 upon receiving the biometric data, and transmits the result of the comparison as a result of the second authentication to the aircraft smart cabin headset 1.

The processor 37 receives the result of the second authentication from the HEU 22 through the wireless transceiver 33 (Step S53) and confirms whether the second authentication is successful (Step S54). When the second authentication is unsuccessful (Step S54: No), the processor 37 causes the speaker 34 to emit a warning audio to inform the user of the failure of the authentication (Step S55) and ends the CKP button process S5. When the second authentication is successful (Step S54: Yes), the processor 37 further confirms whether the depression of the CKP button 321 is a single-press or a double-press depression. When the depression of the CKP button 321 is single-press, the processor 37 transmits the information, including a normal call connection request to the cockpit terminal 241, to the HEU 22 through the wireless transceiver 33 (Step S58). The HEU 22, in turn, transmits a normal call connection request to the cockpit terminal 241. When the depression of the CKP button 321 is double-press, the processor 37 transmits the information, including an emergency call connection request to the cockpit terminal 241, to the HEU 22 through the wireless transceiver 33 (Step S57). The HEU 22, in turn, transmits an emergency call connection request to the cockpit terminal 241.

When the cockpit terminal 241 receives the call connection request, the cockpit terminal 241 causes a lamp in the cockpit terminal 241 to blink and/or emits a sound in the cockpit audio system. The cockpit terminal causes different lamps to blink in the cockpit terminal and/or emit different sound patterns in the cockpit audio system in order to differ between the normal and emergency calls.

Once the user connection between the aircraft smart cabin headset 1 and the cockpit terminal 241 is established by the HEU 22, the processor 37 proceeds to the call termination process S7 as shown in FIG. 11. In the call termination process S7 as shown in FIG. 11, the processor 37 does not transmit the termination request of the user connection to the HEU 22 even when the CKP button 321 is released. When the CKP button 321 is depressed again, the processor 37 transmits the termination request of the user connection to the HEU 22, which terminates the user connection with the cockpit terminal 241. Similarly, the HEU 22 terminates the call if the cockpit terminal 241 drops the call signal. Once the call termination process S7 is completed, the processor 37 ends the CKP button process S5.

As described above, according to the aircraft smart cabin headset 1 of one or more embodiments of the present invention, the attendants wearing the aircraft smart cabin headset 1 can easily inform the cockpit of any emergency occurring in the cabin.

Figure 14:
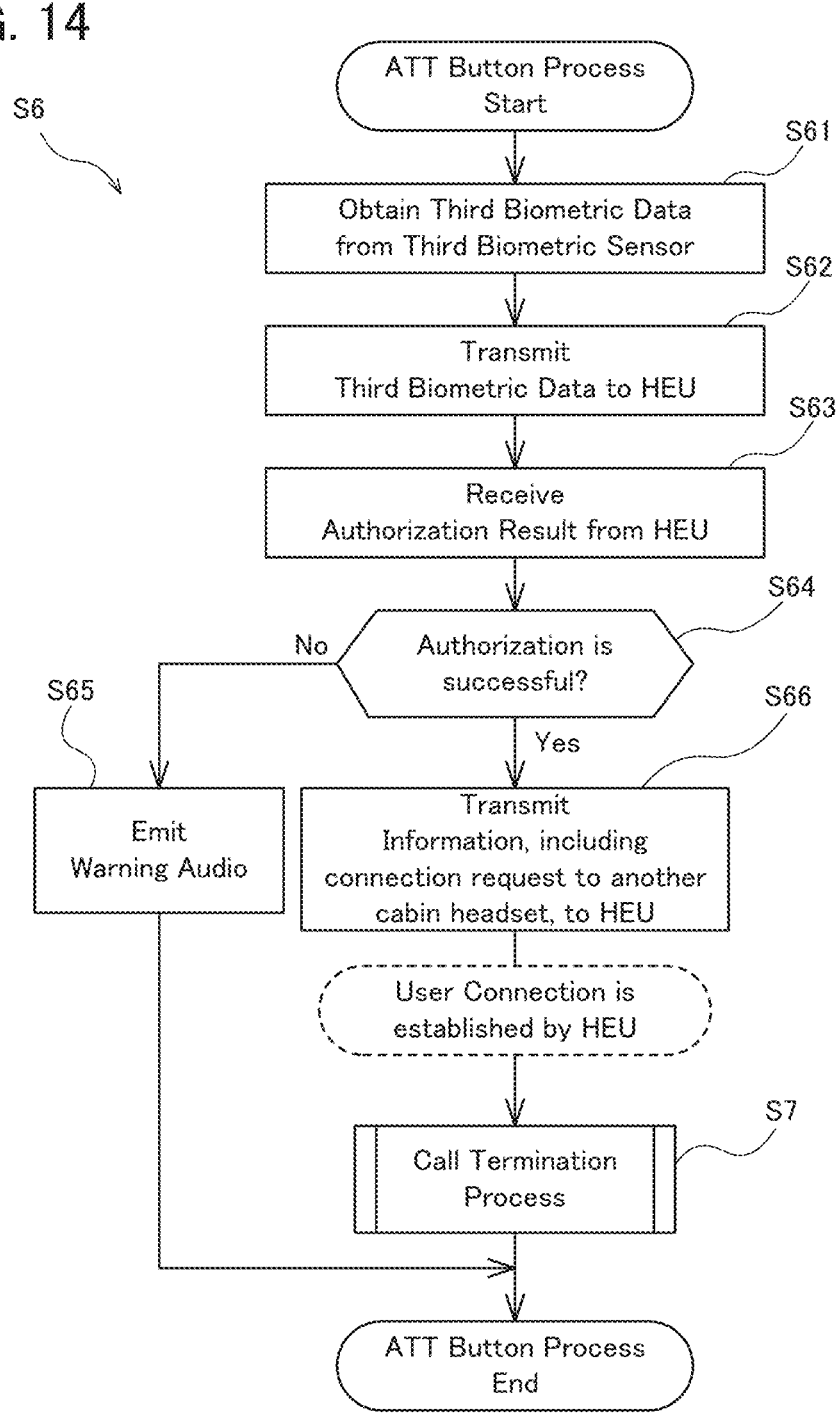
FIG. 14 shows a flowchart of an ATT button process executed by the aircraft smart cabin headset according to one or more embodiments.

FIG. 14 shows a flowchart of the ATT button process S6 executed by the processor 37 of the aircraft smart cabin headset 1 according to one or more embodiments. As shown, in the ATT button process S6, the processor 37 obtains a third biometric data of the user from the third biometric sensor 332 (Step S61) and transmits the third biometric data to the HEU 22 (Step S62). The HEU 22 compares the third biometric data with biometric authentication data stored on the HEU 22 and transmits the result of the comparison as a result of the third authentication to the aircraft smart cabin headset 1.

The processor 37 receives the result of the third authentication from the
HEU 22 through the wireless transceiver 33 (Step S63) and confirms whether the third authentication is successful (Step S64). When the third authentication is unsuccessful (Step S64: No), the processor 37 causes the speaker 34 to emit a warning audio to inform the user of the failure of the authentication (Step S65) and ends the ATT button process S6. When the third authentication is successful (Step S64: Yes), the processor 37 transmits information, including a connection request to the other cabin headset 1', to the HEU, which in turn transmits the call request to the other aircraft smart cabin headset 1' through the wireless transceiver 33 (Step S66).

Once the user connection between the aircraft smart cabin headset 1 and the other aircraft smart cabin headset 1' is established by the HEU 22, the processor 37 proceeds to the call termination process S7 as shown in FIG. 11. In the call termination process S7 as shown in FIG. 11, the processor 37 does not transmit the termination request of the user connection to the HEU 22 even when the ATT button 331 is released. When the CKP button 321 is depressed again, the processor 37 transmits the termination request of the user connection to the HEU 22, which terminates the user connection with the other aircraft smart cabin headset 1'. Once the call termination process S7 is completed, the processor 37 ends the ATT button process.

FIG. 15 shows a table indicating priorities of the PA announcements made from the different terminals/devices in the aircraft in one or more embodiments. As shown, the PA announcement made from the cockpit, has the highest priority level. The PA announcement made from the attendant handsets 233 and 234, the mobile devices 251, and the aircraft smart cabin headsets 1 and 1' have the second priority level. The pre-recorded announcements using the cabin audio/video system have the third priority level, and the background music and video using the cabin audio/video system have the fourth or lowest priority. PA announcements, pre-recorded announcements and background music and video make use of the cabin speakers 231 as the audio output.

For example, when the processor 37 requests a PA announcement from a smart cabin headset 1 to the HEU 22 while a pre-recorded announcement or music/video is playing, the pre-recorded announcement or music/video is ceased or paused by the HEU 22 depending on the system settings and the PA announcement audio from the smart cabin headset 1 is output to the cabin speakers 231.

In another example, when the processor 37 requests a PA announcement from a smart cabin headset 1 to the HEU 22 while a PA announcement from the cockpit terminal 241 is on-going, the HEU 22 transmits a rejection of the request to the aircraft smart cabin headset 1 based on the priority definition. The processor 37 receives the rejection of the connection request to the cabin speakers 231.

In another example, when the cockpit terminal 241 transmits a connection request to the cabin audio system 23 while the aircraft smart cabin headset 1 has the user connection with the cabin audio system 23, the HEU 22 determines the priority of the user connections and terminates or puts on hold the call from the aircraft smart cabin headset 1 and allows the transmission of audio from the cockpit terminal 241 to the cabin speakers 231. In one or more embodiments, only one user connection may be established in the aircraft cabin audio communication system 2. However, a plurality of the user connections may be established simultaneously in one or more embodiments of the aircraft cabin audio communication system 2. In one or more embodiments, a terminal in the aircraft cabin audio communication system 2 may join the user connection between the other two terminals. For example, the other aircraft smart cabin headset 1' can join the user connection between the aircraft smart cabin headset 1 and the cockpit terminal 241, or the cockpit terminal 241 can join the user connection between the aircraft smart cabin headset 1 and 1'.

The aircraft smart cabin headsets according to one or more embodiments described above allow authorized aircraft personnel to communicate instantaneously and share real-time information from anywhere in the aircraft cabin, thereby improving cabin communication and operations. For example, the headsets according to one or more embodiments described above allow flight attendants to conveniently and efficiently transmit and receive audio to/from other flight attendants as well as the cockpit, and to receive chimes for passenger calls. This provides added mobility for the flight attendants and allows them more easily multi-task to more effectively perform their cabin duties.

Although the disclosure has been described with respect to only a limited number of embodiments, those skilled in the art, having benefit of this disclosure, will appreciate that various other embodiments may be devised without departing from the scope. Accordingly, the scope of the invention should be limited only by the attached claims.

The invention claimed is:

1. An aircraft cabin audio communication system comprising:
   a plurality of aircraft smart cabin headsets, each comprising:
      a microphone; and
      an earpiece comprising:
         a speaker;
         a first button, a second button, and a third button;
         a first biometric sensor disposed on the first button;
         a second biometric sensor disposed on the second button;
         a third biometric sensor disposed on the third button;
         a wireless transceiver;
         a power button that switches between a supply of electric power and a stoppage of the supply from a battery to internal devices of the aircraft smart cabin headset;
         a power and data port that allows the aircraft smart cabin headset to charge and connect to an aircraft cabin management system; and
         a processor that:
            performs, when the wireless transceiver connects to an aircraft network, device authentication of the aircraft smart cabin headset based on a device identifier of the aircraft smart cabin headset,
            performs, upon detecting that the first button is depressed, first authentication based on first biometric data obtained from the first biometric sensor,
            establishes, upon determining that the first authentication is successful, user connection with the cabin speakers via the aircraft network,
            performs, upon detecting that the second button is depressed, second authentication based on second biometric data obtained from the second biometric sensor,
            transmits, upon determining that the second authentication is successful, information that comprises a connection request to a cockpit terminal of the aircraft through the wireless transceiver,
            performs, upon detecting that the third button is depressed, a third authentication of based on third biometric data obtained from the third biometric sensor, and
            transmits, upon determining that the third authentication is successful, information that comprises a connection request to another aircraft smart cabin headset through the wireless transceiver;
   a first server that stores biometric authentication data; and
   a second server that controls user connection among the plurality of aircraft smart cabin headsets, a cockpit terminal, and other aircraft cabin audio communication system components;
   wherein the aircraft network connects the plurality of aircraft smart cabin headsets, the cockpit terminal, other aircraft cabin audio communication system components, the first server, and the second server.

2. The aircraft cabin audio communication system according to claim 1, wherein, for each of the plurality of aircraft smart cabin headsets, the processor performs the first, the second, or the third authentication by:
   transmitting, through the wireless transceiver, the first, the second, or the third biometric data to the first server that compares the first, the second, and the third biometric data respectively with the stored biometric authentication data, and
   receiving a result of the comparison.

3. The aircraft cabin audio communication system according to claim 1, wherein, for each of the plurality of aircraft smart cabin headsets:
   the processor performs the device authentication by transmitting, through the wireless transceiver, the device identifier to the first server that compares the device identifier with device identifiers stored on the first server, and
   the processor transmits a connection request that is acceptable for the second server that controls user connection among the aircraft smart cabin headset, the cockpit terminal, and other aircraft cabin audio system components in a case that the device authentication is successful.

4. The aircraft cabin audio communication system according to claim 1, wherein, for each of the plurality of aircraft smart cabin headsets:

once user connection between the aircraft smart cabin headset and the cabin speakers is established, the processor terminates the user connection with the aircraft network when the first button is released; and once user connection between the aircraft smart cabin headset and the cockpit terminal is established, the processor terminates the user connection with the cockpit terminal when the second button is depressed again.

5. The aircraft cabin audio communication system according to claim 1, wherein, for each of the plurality of aircraft smart cabin headsets, the processor, upon detecting a double-depress of the second button, the processor transmits an emergency indicator in addition to the connection request to the cockpit terminal through the wireless transceiver.

6. The aircraft cabin audio communication system according to claim 1, wherein playback of pre-recorded announcement or background music/video to the cabin speakers is terminated when the processor transmits a termination command following a connection request by a higher priority audio source.

7. The aircraft cabin audio communication system according to claim 1, wherein, for each of the plurality of aircraft smart cabin headsets:

the processor receives a rejection of the connection request to the aircraft network when transmitting the connection request while the aircraft cabin audio communication system has an active connection with the cockpit terminal; and the processor receives a termination of user connection to the aircraft network when the cockpit terminal transmits a connection request to the aircraft cabin audio communication system while the aircraft smart cabin headset has the user connection with the aircraft network.

* * * * *